Jan. 10, 1956 G. A. PHILBRICK 2,730,679

DELAYED-RECOVERY ELECTRIC FILTER NETWORK

Filed May 18, 1951

INVENTOR
George A. Philbrick
BY
Curtis, Morris + Safford
ATTORNEYS

United States Patent Office 2,730,679

Patented Jan. 10, 1956

2,730,679

DELAYED-RECOVERY ELECTRIC FILTER NETWORK

George A. Philbrick, Dover, Mass.

Application May 18, 1951, Serial No. 226,963

11 Claims. (Cl. 333—70)

This invention relates to an electric filter network, and more particularly to a delayed-recovery, high-pass filter network which transmits the early portion of a transient voltage signal substantially without distortion but the output of which thereafter relatively rapidly recovers to a quiescent value of zero voltage when the impressed signal becomes quiescent at any voltage.

Filter networks of this type frequently are required in electronic equipment for A. C. coupling, pulse forming and shaping, differentiating, etc. For example, in cathode-ray oscilloscopes it often is desirable to display high-frequency transients without distortion and thereafter to return the horizontal trace relatively rapidly to zero value when the input signal returns to a steady state value. This necessitates a special input circuit.

Prior to the present invention no simple filter was available to accomplish this result. In the past it has been customary to use a simple series-capacitor, shunt-resistor, high-pass filter network for this purpose. When this conventional type of filter network is used in such circuits, it is subject to certain disadvantages. If high-frequency transients are to be transmitted with negligible distortion its recovery time usually is entirely too long for practical purposes or, if made to have a recovery time of practical length, considerable distortion is introduced into the transient being transmitted.

Accordingly, it is an object of the present invention to provide a filter network having a transmission characteristic such that initial high-frequency transients of the input signal are transmitted substantially without distortion followed after a predetermined time-delay by a relatively rapid return of the output voltage to zero irrespective of the actual magnitude of the quiescent value of the input signal.

A further object of this invention is to provide a filter of this type which is simple and inexpensive and one which may be readily constructed to give the operating characteristics desired.

These and other objects, advantages and applications of the present invention will be in part obvious and in part pointed out hereinafter.

The invention, accordingly, consists in the features of construction, combination of elements, and arrangement of parts which will be exemplified in the structure to be hereinafter described and the scope of the application of which will be indicated in the followng claims.

A more complete understanding of the nature and operation of this invention will be apparent from the following description taken in conjunction with the attached drawings in which.

Figure 1:
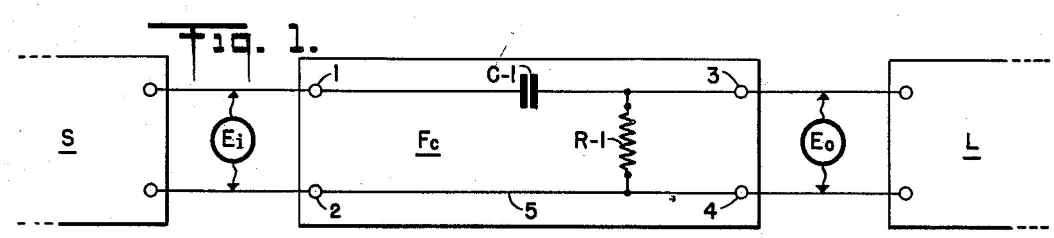
Figure 1 represents diagrammatically a conventional filter network.

In Figure 1 is shown a conventional filter network, generally indicated at Fc, customarily used in the past in instances where a high-pass filter has been required for transmitting high-frequency transients with a minimum of distortion while still permitting the output voltage ultimately to be restored to a zero value. A low impedance signal source, generally indicated at S, is shown connected to the input terminals 1 and 2 of this conventional filter network Fc, and its output terminals 3 and 4 are shown connected to the input terminals of a high impedance load, generally indicated at L. This conventional filter network Fc comprises a common conductor 5 joining input terminal 2 directly with output terminal 4, a series capacitance C–1 connected between input terminal 1 and output terminal 3, and a resistance R–1 connected between output terminals 3 and 4, all as shown in this drawing. In some instances the resistance R–1 also may constitute the load of such a network.

Such a conventional filter network is subject to the disadvantage that, if the time constant determined by the capacitor C–1 and the resistor R–1 is short, high-frequency transients will be considerably distorted in transmission through the filter Fc. On the other hand, if the time constant of this conventional filter Fc is increased sufficiently so that high-frequency transients are transmitted substantially without distortion, then a correspondingly longer period of time is required for the output voltage to recover to a zero value after the input signal reaches a steady-state value. Such a long recovery time usually is inconvenient and may be completely impractical in some instances.

Figure 3:
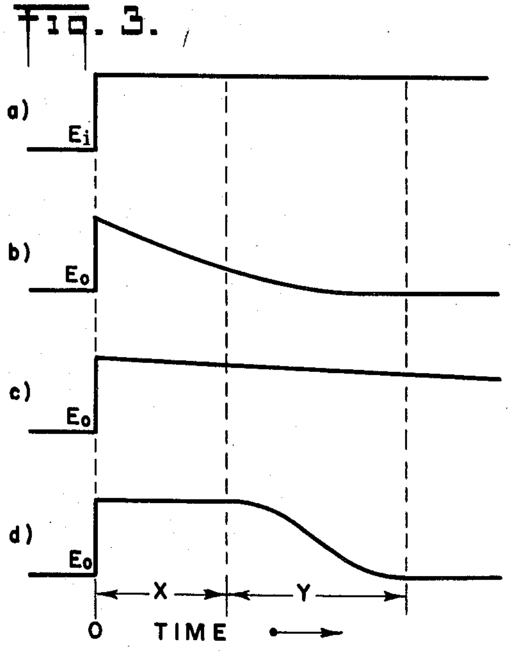
Figure 3 shows a series of response curves illustrating in an exaggerated manner the operation of the filter networks shown in Figures 1 and 2.

This effect may be more readily understood by reference to the response curves shown in Figure 3. If a stepped input voltage Ei, such as that shown in curve 3(a), is applied from the signal source S to the input terminals 1 and 2 of filter Fc, and the time constant of the filter network Fc is sufficiently small so as to cause the output voltage Eo to be reduced to zero within a practical period of time, then the transient portion of the stepped input signal Ei, shown in curve 3(a), will suffer serious distortion in transmisson through the filter Fc to load L so that the output sgnal Eo will appear somewhat as shown in curve 3 (b). On the other hand, if the components of filter Fc are selected to provide a time constant of such length that the output voltage signal Eo is a substantially faithful reproduction of the input signal voltage Ei, as shown in curve 3(c), then it will take an impractical length of time for the output voltage Eo to recover to a zero value.

In accordance with the present invention a novel filter network is provided which overcomes these disadvantages of known filter networks such as the conventional network shown in Figure 1.

Figure 2:
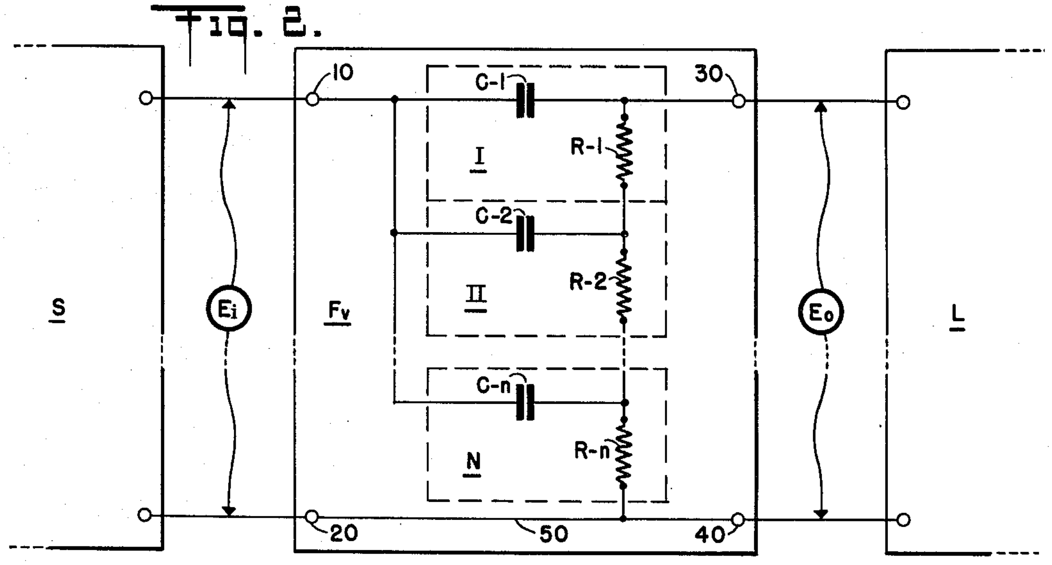
Figure 2 shows diagrammatically a filter network embodying the present invention.

A filter network embodying the present invention is shown in Figure 2 and is generally indicated at Fv. As in the case of Figure 1, a low impedance signal source S is connected to the input terminals 10 and 20 of filter Fv and its output terminals 30 and 40 are connected to a high impedance load L. This filter network Fv comprises a plurality of sections each composed of a capacitance and a resistance. For convenience it may be termed a "vertical-section" filter network because of the arrangement of these individual sections in the circuit diagram in vertical sequence or "layers" between the input and output terminals.

As shown in Figure 2, this filter network Fv is provided with a pair of input terminals 10 and 20 and a pair of output terminals 30 and 40, with input terminal 20 being connected through a common conductor 50 directly to the output terminal 40. The first section, generally indicated at I, of this filter network Fv includes a first capacitance C–1 connected in series between input terminal 10 and output terminal 30, and a first resistance R–1 connected from output terminal 30 to the second section, generally indicated at II. Section II is identical in arrangement with section I, in that it includes a second capacitance C–2 connected from input terminal 10 to the other end of the first resistance R–1, and a second resistance R–2 connected from the junction between R–1 and C–2 to the next section, e. g. the section generally indicated at N. Section N is identical in arrangement with each of the preceding sections, comprising a capacitance C–*n* connected from input terminal 10 to the lower end of the resistance in the preceding section, e. g. R–2, and a resistance R–*n* connected from the junction of resistance of the preceding section, e. g. R–2, and capacitance C–*n* to the common conductor 50 connecting input terminal 20 to output terminal 40.

In accordance with this invention such a "vertical-section" filter network may comprise two or more individual sections I, II, . . . N connected in the manner just described. If only two sections are required then, referring to Figure 2, capacitance C–*n* and resistance R–*n* are omitted and the lower end of resistance R–2 is connected to the common conductor 50. If more than three sections are to be used, such additional sections are inserted at the places indicated by broken lines in the connections between sections II and N.

In operation, when a stepped input signal, such as is shown in curve 3(*a*), is applied to the novel filter network of this invention, the transient portion of this signal, for example that portion of the signal indicated by X in Figure 3, is transmitted susbtantially without distortion, as shown in the first part of curve 3(*d*). Thereafter, after a time-delay of predetermined duration, e. g. X in Figure 3, the output signal E*o* recovers relatively rapidly, i. e. returns to zero voltage, as shown in the latter part of curve 3(*d*).

Figure 4:
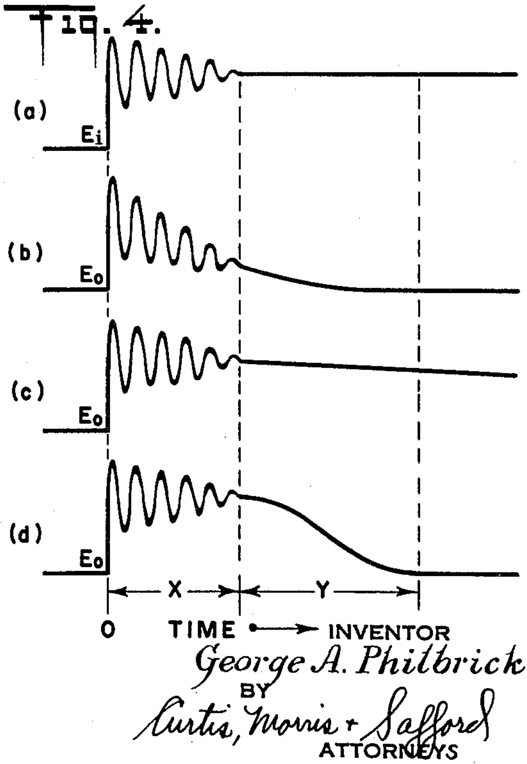
Figure 4 shows another series of such illustrative response curves.

The importance of this manner of operation of this novel filter network circuit may be more easily understood by reference to the response curves shown in Figure 4. Curve 4(*a*) represents a stepped input signal, similar to that shown in curve (*a*) in Figure 3 but having superposed thereon a high-frequency transient component, which is to be impressed on the input terminals of the filter network Fv. If such an input signal E*i* is applied to the input terminals of a conventional filter network Fc having a short time constant, it will suffer serious distortions so that the output signal E*o* from the filter network Fc will appear somewhat as shown in curve 4(*b*). On the other hand, if the components of the filter network Fc are selected so as to transmit the high-frequency transient portion of the input signal E*i* substantially without distortion as shown in curve 4(*c*), an inordinate period of time will be required before the output voltage E*o* returns to zero. With a filter network in accordance with the present invention, the transient portion X of the input signal E*i* will be transmitted substantially without distortion as shown in curve 4(*d*), followed by a relatively rapid recovery of the output signal E*o* to zero voltage as shown in the latter portion of that curve. By proper selection of the number of sections to be used in the filter network and of the values of the components in these sections, the time-delay period X during which the transient is transmitted substantially without distortion and the period of time Y during which recovery to zero occurs can be determined to fit the desired conditions of operation. It is to be understood that the response curves shown in Figures 3 and 4 are not intended to be quantitative representations of the operations described above but merely to illustrate such operations in a somewhat exaggerated manner for convenience in understanding the present invention.

In using a filter of the present invention, as in the manner just described, it is frequently desirable to extend the transient transmission period, i. e. time-delay period X, and to reduce the recovery time Y. In accordance with the present invention these desirable ends are accomplished by selecting the values of the condensers C–1, C–2, . . . C–*n* so that they increase in value in that order, i. e. so that C–1 is less than C–2 . . . is less than C–*n*. Similarly, this desirable operation also can be accomplished by selecting the values of the resistances R–1, R–2, . . . R–*n* so that they decrease in that order, i. e. so that R–1 is greater than R–2 . . . is greater than R–*n*. Furthermore, the selection of values can be made more effective for this purpose by selecting the values of these resistances and capacitances so that the time constants of each section of this filter network are of the same order of magnitude and preferably approximately equal, e. g. so that the product of R–1 and C–1 is equal to the product of R–2 and C–2 . . . is equal to the product of R–*n* and C–*n*.

As pointed out above, the efficacy of this novel filter network is enhanced when the output impedance of the signal source S is of relatively low value, compared with the smallest of the resistances R–1 to R–*n*, and when the input impedance of the load L is of relatively high value, compared with the highest of those resistances.

It is to be understood that any number of "vertical" sections may be used, and that the exact numbers of such sections and the values of their components C–1, C–2, R–1, R–2, etc. are determined in accordance with the time-delay and the speed of recovery desired, the output impedance of the signal source S and the input impedance of the load L. As an example of actual values of components which have been found to provide an efficient filter network embodying the advantages of the present invention, a three section filter has the following values: C–1, equal to .01 mfd.; C–2 equal to .02 mfd., and C–3 equal to .05 mfd., R–1 equal to 3.3 megohms, R–2 equal to 1.0 megohm and R–3 equal to 0.51 megohm. Such a filter provided a time-delay or transient transmitting portion X equal to approximately 10 milliseconds and a recovery portion Y equal to approximately 100 milliseconds when used between the driving source of about $10^3$ ohms output impedance and a load of over $10^8$ ohms input impedance.

If it is desired to provide a filter network in accordance with the present invention in which the response times X and Y may be adjusted to various values dependent upon the speed of operation required without changing the character of the response, ganged variable components or ganged switching arrangements can be used to accumplish this result.

As many possible embodiments may be made of the above invention and as many changes might be made in the embodiment above set forth without departing from the scope thereof, it is to be understood that all matter herein set forth or shown in the accompanying drawings is to be interpreted as illustrative and not in a limiting sense.

I claim:

1. A delayed-recovery high-pass filter network adapted to be interposed between a signal source and a load, comprising, in combination, first and second input terminals, first and second cooperating output terminals adapted to have a load connected therebetween, a common connection from said second input terminal to said second output terminal, a first capacitance connected between said first input terminal and said first output terminal, two resistances connected in series between said first and second output terminals, and a seuond capacitance connected directly between said first input trminal and the connection between said series-connected resistances.

2. A filter network of the type recited in claim 1 wherein the value of said first capacitance is less than the value of said second capacitance and the value of said first resistance is greater than the value of said second resistance.

3. A filter network of the type recited in claim 1 wherein the time constant of said first capacitance and resistance is approximately equal to the time constant of said second capacitance and resistance.

4. A delayed-recovery high-pass filter network adapted to be interposed between a signal source and a load, comprising, in combination, first and second input terminals, first and second cooperating output terminals adapted to have a load connected therebetween, a common connection from said second input terminal to said second output terminal, a plurality of vertical filter sections, each filter section including a capacitance and a resistance, the capacitance of the first filter section being connected between said first input terminal and said first output terminal, one side of the resistance of the first filter section being connected to said first output terminal, the resistances of all of the remaining filter sections being connected in series from the other end of said first resistance to said common connection, the capacitances of each of the remaining filter sections being connected directly from said first input terminal to the junction between its corresponding resistance and the resistance of the filter section immediately preceding it.

5. A filter network of the type recited in claim 4 wherein the value of each resistance is smaller in each successive filter section from said first input and output terminals towards said second input and output terminals.

6. A filter network of the type recited in claim 4 wherein the value of each capacitance is larger in each successive filter section from said first input and output terminals toward said second input and output terminals.

7. A filter network of the type recited in claim 4 wherein the time constants of all of the filter sections are of the same order of magnitude.

8. A delayed-recovery high-pass filter network adapted to be interposed between a signal source and a load, comprising, in combination, first and second input terminals, first and second cooperating output terminals adapted to have a load connected therebetween, a common connection from said second input terminal to said second output terminal, a resistive circuit connected between said output terminals, and a plurality of condensers, each connected directly from said first input terminal to respective points spaced along said resistive circuit, said respective spaced points including the point of connection of said resistive circuit to said first output terminal, a portion of said resistive circuit extending from the last respective spaced point to said second output terminal.

9. A delayed-recovery high-pass filter comprising first and second co-operating input terminals adapted to have a source of electrical signals connected thereacross, first and second co-operating output terminals adapted to have an electrical load connected thereacross, a direct connection from said second input terminal to said second output terminal, a plurality of vertical filter sections, each filter section including a capacitance having respective input and output sides and a resistance, all of said capacitances having their respective input sides directly connected to said input terminal, all of said resistances in each respective filter section having one respective side directly connected to the output side of the capacitance in the same respective filter sections, the other side of the resistance of the last filter section being directly connected to the second output terminal, circuit means connecting the output side of the capacitance of the first filter circuit and also connecting said one side of the resistance of the first filter circuit through a substantially purely conductive path to the first output terminal, and other circuit means connecting the output side of the capacitance and also said one side of the resistance of each remaining filter section through a substantially purely conductive path to the other respective side of the resistance of the filter section immediately preceding it.

10. A delayed-recovery high-pass filter as claimed in claim 9 and wherein the respective capacitance values of the capacitances in the successive filter circuits increase in value in order from the first to the last filter circuit and wherein the respective resistance values of the resistances in the successive filter circuits decrease in value in order from the first to the last filter circuit, and wherein the products of the respective capacitance values and respective resistance values in each filter circuit are all substantially equal.

11. A delayed-recovery high-pass filter network to be interposed between a signal source and a load, comprising first and second input terminals, first and second cooperating output terminals adapted to have a load connected therebetween, a common connection from said second input terminal to said second output terminal, a first capacitance connected between said first input terminal and said first output terminal, two resistances connected in series between said first and second output terminals, and a second capacitance connected directly between said first input terminal and the connection between said series connected resistances, the value of said second capacitance being greater than the value of the first capacitance, the value of said second resistance being less than the value of the first resistance, and the time constant of the first capacitance and resistance is approximately equal to the time constant of the second capacitance and resistance.

References Cited in the file of this patent

UNITED STATES PATENTS

| | | |
|---|---|---|
| 2,121,091 | Maginnis | June 21, 1938 |
| 2,251,973 | Beale et al. | Aug. 12, 1941 |
| 2,354,141 | Purington | July 18, 1944 |
| 2,403,616 | Sanders | July 9, 1946 |
| 2,459,131 | Mesner | Jan. 11, 1949 |
| 2,503,540 | Augustadt | Apr. 11, 1950 |
| 2,577,893 | Holst et al. | Dec. 11, 1951 |

FOREIGN PATENTS

| | | |
|---|---|---|
| 570,966 | Great Britain | July 31, 1945 |